(12) United States Patent
Norwich

(10) Patent No.: US 10,054,172 B2
(45) Date of Patent: Aug. 21, 2018

(54) PISTON TO DAMPER TAB RIVET CONNECTION

(71) Applicant: Schaeffler Technologies AG & Co. KG, Herzogenaurach (DE)

(72) Inventor: Victor Norwich, Columbus, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 182 days.

(21) Appl. No.: 14/966,653

(22) Filed: Dec. 11, 2015

(65) Prior Publication Data

US 2017/0167549 A1    Jun. 15, 2017

(51) Int. Cl.
| | |
|---|---|
| F16H 45/02 | (2006.01) |
| F16D 25/0635 | (2006.01) |
| F16D 13/40 | (2006.01) |
| F16H 41/24 | (2006.01) |

(52) U.S. Cl.
CPC .......... F16D 25/0635 (2013.01); F16D 13/40 (2013.01); F16H 41/24 (2013.01); *F16H 2045/0221* (2013.01)

(58) Field of Classification Search
CPC ................. F16D 25/0635; F16D 13/40; F16H 2045/0221; F16H 2045/0205
USPC ............................................ 192/3.28; 60/338
See application file for complete search history.

(56) References Cited

U.S. PATENT DOCUMENTS

| | | | |
|---|---|---|---|
| 2004/0050639 A1* | 3/2004 | Back | F16H 45/02 192/3.28 |
| 2010/0230225 A1* | 9/2010 | Yamashita | F16H 41/28 192/3.29 |
| 2013/0256080 A1 | 10/2013 | Luipold | |
| 2015/0023795 A1 | 1/2015 | Jameson | |

* cited by examiner

*Primary Examiner* — F. Daniel Lopez
*Assistant Examiner* — Daniel Collins
(74) *Attorney, Agent, or Firm* — Davidson, Davidson & Kappel, LLC

(57) ABSTRACT

A drive assembly of a torque converter is provided. The drive assembly includes a piston having at least one tab, and a damper assembly. The piston is fixed to the damper assembly by the at least one tab. A method of forming a drive assembly for a torque convert is also provided. The method of forming a drive assembly for a torque converter includes fixing a piston and a damper assembly together by a plurality of piston tabs forming a riveted connection. A torque converter is also provided.

18 Claims, 1 Drawing Sheet

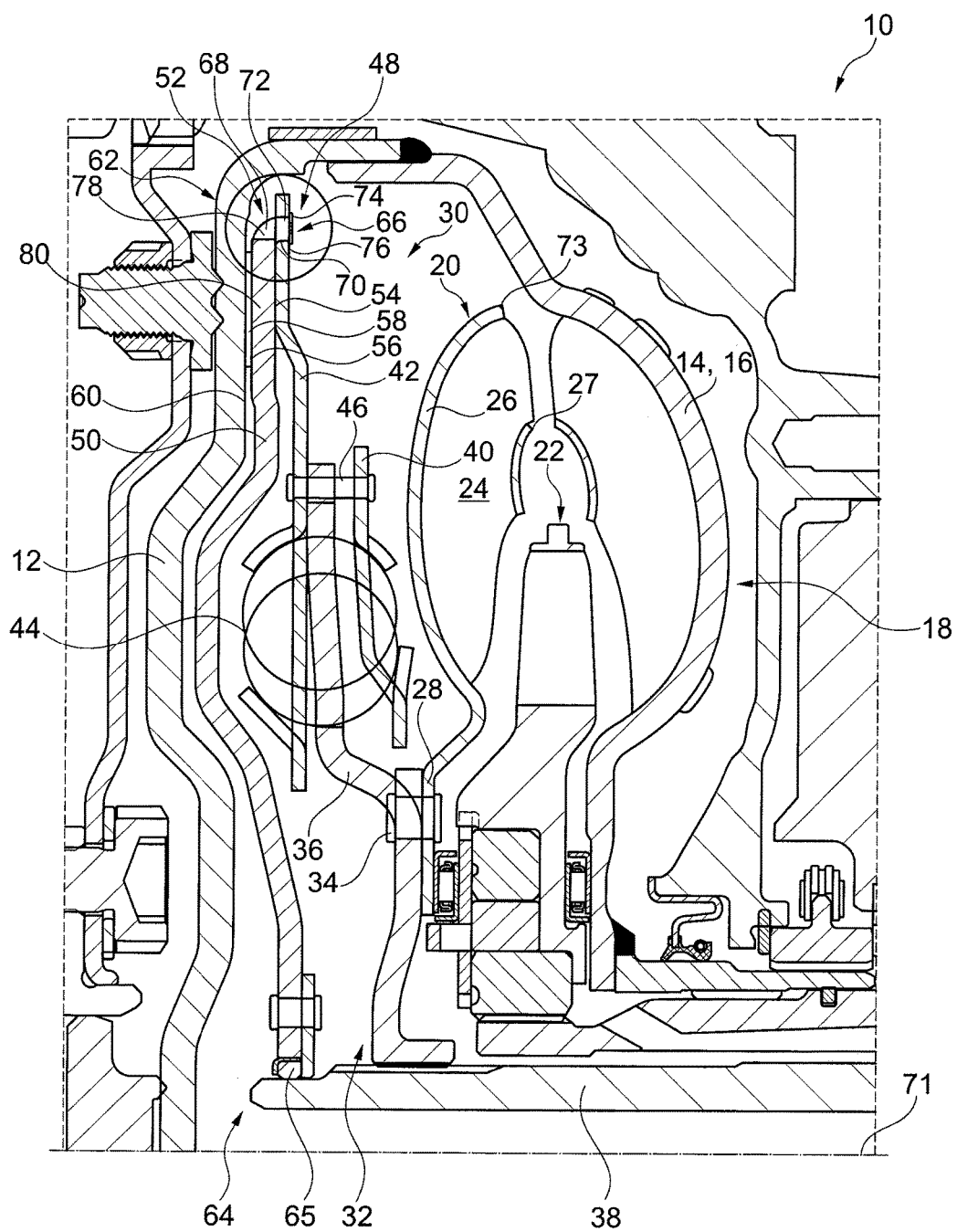

PISTON TO DAMPER TAB RIVET CONNECTION

The present disclosure relates generally to a drive assembly of a torque converter and specifically to a drive assembly with a piston having a tab that is connected to a damper assembly.

BACKGROUND

U.S. Pat. Pub. 2013/0256080 discloses using a ring gear carrier with an integrated rivet connection. U.S. Pat. Pub. 2015/0023795 discloses a tab rivet connection for fixing a turbine shell to a damper including at least one rectangular rivet.

SUMMARY OF THE INVENTION

A drive assembly of a torque converter is provided. The drive assembly includes a piston having at least one tab; and a damper assembly. The piston is fixed to the damper assembly by the at least one tab.

A torque converter is also provided. The torque converter includes a turbine and the drive assembly fixed to the turbine.

A method of forming a drive assembly for a torque convert is also provided. The method of forming a drive assembly for a torque converter includes fixing a piston and a damper assembly together by a plurality of piston tabs forming a riveted connection.

BRIEF DESCRIPTION OF THE DRAWING

The present invention is described below by reference to the following drawings, in which:

FIGURE. 1 shows a side cross sectional view of a torque converter according to an embodiment of the present invention.

DETAILED DESCRIPTION

The present disclosure provides a drive assembly of a torque converter that has a riveted connection between a piston and a damper assembly that may reduce the cost of manufacturing the drive assembly. Instead of a conventional damper assembly a riveted connection is created between a bent tab on the axial end of the piston and a slot in a cover plate of the damper assembly.

FIG. 1 shows a cross-sectional side view of a torque converter 10 in accordance with an embodiment of the present invention. Torque converter 10 includes a cover plate 12 for connecting to a crankshaft of an internal combustion engine and a rear cover 14 forming a shell 16 of an impeller or pump 18. Torque converter 10 also includes a turbine 20 opposite impeller 18 and a stator 22 axially between impeller 18 and turbine 20. Turbine 20 includes a plurality of blades 24 supported on a rounded portion 26 of turbine 20 at a front cover side of blades 24 and on a core ring 27 at a rear cover side of blades 24. Turbine 20 further includes an inner radial extension 28 protruding radially inward from rounded portion 26. On a front-cover side of turbine 20, turbine 20 is connected to a damper assembly 30.

Damper assembly 30 includes inner radial end 32 riveted to inner radial extension 28 of turbine 20 by a plurality of circumferentially spaced rivets 34. More specifically, damper assembly 30 is riveted to turbine 20 by a drive flange 36 of damper assembly 30. At an inner circumferential surface of inner radial end 32, drive flange 36 includes splines configured for connecting to splines formed on an outer circumferential surface of a transmission input shaft 38. Damper assembly 30, between inner radial end 32 and front cover 12, further includes a first or turbine side cover plate 40 and a second or front cover side cover plate 42 holding a plurality of springs 44 axially therebetween. Cover plates 40, 42 are riveted together by a plurality of circumferentially spaced rivets 46, which are radially outside of rivets 34. Drive flange 36 is axially between cover plates 40, 42 and includes a plurality of circumferentially spaced slots formed therein for receiving springs 44 such that drive flange 36 is drivingly coupled to cover plates 40, 42 via springs 44. Cover plate 40 is axially between drive flange 36 and a piston 50. Cover plate 42 extends radially outside of springs 44 and rivets 46 to form a radially outer end 48 of cover plate 42. At radially outer end 48, cover plate 42 is fixed to a radially outer end 52 of piston 50 at a turbine side radially extending surface 54 of piston 50.

At a front cover side radially extending surface 56 thereof, piston 50 includes a friction material 58 fixed thereto. Friction material 58 is configured for contacting an inner radially extending surface 60 of front cover 12 to form a lockup clutch 62 of torque converter 10 for drivingly coupling turbine 20 to front cover 12 via damper assembly 30. A radially inner end 64 thereof, piston 50 includes a seal 65 for axially sliding along the outer circumferential surface of transmission input shaft 38. Fluid pressure differences between a front cover side of piston 50 and a rear cover side of piston 50 control whether piston 50 is engaged with or is disengaged from front cover 12. When lockup clutch 62 is engaged, piston 50 transfers torque from front cover 12 to cover plates 40, 42 through a riveted connection 66. Cover plates 40, 42 in turn transfer the torque to drive flange 36, via springs 44, to drive transmission input shaft 38. In other words, when the lockup clutch 62 is engaged, front cover 12 and drive flange 40, and thus front cover 12 and the transmission input shaft, are coupled together via damper assembly 30 and the riveted connection 66 between piston 50 and cover plate 42.

Riveted connection 66 is formed by a plurality of tabs 68 of piston 50 each being inserted through a corresponding one of a plurality of slots 70 extending axially through cover plate 42. Tabs 68 are circumferentially spaced from each other about a center axis 71 of torque converter 10 and slots 70 are similarly circumferentially spaced from each other. Tabs 68 are formed at radially outer end 52, radially outside of an outer diameter 73 of turbine 20, and extend axially away from the rest of piston 50 and radially extending surface 60 of front cover 12 and toward turbine 20. Tabs 68 each includes an axially extending section 72 that is aligned parallel to center axis 71 of torque converter 10 and positioned in the corresponding slot 70 and a head 74 contacting a turbine side radially extending surface 76 of cover plate 42. Head 74 is radially larger than axially extending section 72 and of the corresponding slot 70. Each tab 68 further includes a bend 78 connecting axially extending section 72 to a radially extending section 80 of piston 50 that is provided with friction material 58.

A method for fixing piston 50 and damper assembly 30 includes passing tabs 68, which are formed of a malleable metal, for example HSLA 045YLF or SAE 1035, before tabs 68 include heads 74, into corresponding slots 70 such that free axial ends of tabs 68, which are opposite of ends of tabs 68 that are connected to radially extending section 80 at bends 78, extend axially past turbine side radially extending surface 76 of cover plate 42. The free axial ends are then stamped by a punch, causing the free ends to radially expand to form heads 74 that axially fix tabs 68 to cover plate 42, thus forming the riveted connection 66.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A drive assembly for a torque converter comprising:
   a piston including a plurality of piston tabs; and
   a damper assembly, the plurality of piston tabs forming a riveted connection fixing the piston to the damper assembly.

2. The drive assembly as recited in claim 1 wherein the piston tabs are a malleable material.

3. The drive assembly as recited in claim 1 wherein the damper assembly includes a cover plate, the cover plate including slots, each of the slots accepting one of the piston tabs.

4. The drive assembly as recited in claim 3 wherein each of the piston tabs includes a head contacting a radially extending surface of the cover plate, the contacting between the head and the radially extending surface forming the riveted connection.

5. The drive assembly as recited in claim 3 wherein the cover plate has a first radially extending surface and a second radially extending surface, the slots extending axially through the first radially extending surface and the second radially extending surface.

6. The drive assembly as recited in claim 3 wherein the damper assembly includes a further cover plate, the cover plate and the further cover plate being fixed together and supporting a plurality of circumferentially spaced springs.

7. The drive assembly as recited in claim 6 wherein the cover plate and the further cover plate are fixed together by fasteners, the piston tabs being radially outside of the fasteners.

8. The drive assembly as recited in claim 7 wherein the fasteners are rivets.

9. The drive assembly as recited in claim 1 wherein each of the piston tabs includes a bend connecting an axially extending section of the respective piston tab to a radially extending section of the piston.

10. The drive assembly as recited in claim 9 wherein each of the axially extending sections extends from the respective bend axially through a respective slot in the damper assembly toward a turbine.

11. The drive assembly as recited in claim 1 wherein the piston includes a friction material fixed to a radially extending surface of the piston, the piston tabs being radially outside of the friction material.

12. The drive assembly as recited in claim 1 wherein the damper assembly includes a cover plate including slots for receiving springs, the piston being fixed to the cover plate by the piston tabs radially outside of the springs.

13. A torque converter comprising:
    a turbine; and
    the drive assembly as recited in claim 1 fixed to the turbine.

14. A method of forming a drive assembly for a torque converter comprising:
    fixing a piston and a damper assembly together by a plurality of piston tabs forming a riveted connection.

15. The method as recited in claim 14 wherein the damper assembly includes a cover plate, the cover plate including a plurality of slots, each slot being configured to accept one of the plurality of piston tabs, the fixing the cover plate to the piston including inserting each of the plurality of piston tabs into one of the corresponding plurality of slots.

16. The method as recited in claim 15 wherein each of the piston tabs includes an axially extending section received in the corresponding slot, the axially extending section being parallel to a center axis of the piston.

17. The method as recited in claim 15 wherein piston tabs each include a free axial end, the fixing including stamping the free axial ends after the piston tabs are inserted into the corresponding slots to form the riveted connection.

18. A drive assembly for a torque converter comprising:
    a piston; and
    a damper assembly, the piston having at least one tab, the piston being fixed to the damper assembly by the at least one tab, the piston including a friction material fixed to a radially extending surface of the piston, the at least one tab being radially outside of the friction material.

* * * * *